United States Patent [19]
Raether et al.

[11] Patent Number: 5,826,790
[45] Date of Patent: Oct. 27, 1998

[54] TEMPERATURE-SENSITIVE SHUTOFF VALVE

[75] Inventors: Scott E. Raether, Oconomowoc; John C. Schadt, Watertown, both of Wis.

[73] Assignee: Sentry Equipment Corp., Oconomowoc, Wis.

[21] Appl. No.: 895,887

[22] Filed: Jul. 17, 1997

[51] Int. Cl.[6] .................................. G05D 23/12
[52] U.S. Cl. ........................ 236/48 R; 236/93 A
[58] Field of Search .................. 236/93 R, 93 A, 236/99 J, 99 R, 100, 48 R; 137/554

[56] References Cited

U.S. PATENT DOCUMENTS

| | | | |
|---|---|---|---|
| H1190 | 6/1993 | Cramer | 73/863.61 |
| 2,214,375 | 9/1940 | Jackson | 137/139 |
| 2,325,189 | 7/1943 | McCollum | 137/161 |
| 2,822,816 | 2/1958 | Schutmaat | 137/80 |
| 2,898,046 | 8/1959 | Eskin et al. | 236/48 R |
| 3,386,065 | 5/1968 | Algino | 236/93 A |
| 3,599,670 | 8/1971 | Gurner et al. | 137/614 |
| 3,706,321 | 12/1972 | Vicari | 137/554 |
| 3,768,731 | 10/1973 | Lavado | 236/93 A |
| 3,836,074 | 9/1974 | Meulendyk | 236/93 |
| 4,182,369 | 1/1980 | Akkerman | 137/596.18 |
| 4,361,167 | 11/1982 | Harasewych | 236/48 R |
| 4,438,777 | 3/1984 | Pirkle | 137/62 |
| 4,460,007 | 7/1984 | Pirkle | 236/48 R |
| 4,469,275 | 9/1984 | DeSalve | 236/100 |
| 4,508,132 | 4/1985 | Mayfield, Jr. et al. | 137/62 |
| 4,671,314 | 6/1987 | Heil | 137/340 |
| 4,778,104 | 10/1988 | Fisher | 236/80 R |
| 4,822,570 | 4/1989 | Lerman et al. | 422/119 |
| 5,005,432 | 4/1991 | Faulkner | 73/863.86 |
| 5,431,187 | 7/1995 | Nee | 137/599 |

*Primary Examiner*—William E. Tapolcai
*Attorney, Agent, or Firm*—Jansson, Shupe, Bridge & Munger, Ltd.

[57] ABSTRACT

A new temperature-sensitive valve for handling liquids includes a housing having a valve seat and a valving member mounted for movement from a flow-permitting first position spaced from the seat to a flow-blocking second position against the seat. A latching mechanism is coupled to the valving member for retaining such member in the first position when the temperature of the liquid is below a shutoff temperature. A temperature-sensitive device is mounted in the valve body and has an actuator coupled to the latching mechanism. The valve body has a chamber containing the sensing portion of the temperature-sensitive device and also has flow apertures positioned so that when the valve is open, liquid flows across and is in contact with the sensing portion for excellent heat transfer and quick response. The latching mechanism is released and the valving member moves to the second position when the temperature of the liquid is above the shutoff temperature. Sensitive analyzing instruments are thereby protected from exposure to liquids, the temperature of which may be damaging to the instruments.

15 Claims, 4 Drawing Sheets

TEMPERATURE-SENSITIVE SHUTOFF VALVE

FIELD OF THE INVENTION

This invention relates generally to fluid handling and, more particularly, to fluid handling valves which are temperature sensitive.

BACKGROUND OF THE INVENTION

Many types of industrial systems involve processes and process liquids, specific characteristics of which need to be analyzed from time to time. An example is an electrical generating plant, the hot steam condensate of which is periodically checked for pH, contaminants and the like. Another example is a crude oil refining plant in which various "fractions," e.g., gasoline, kerosene, lubricating oil stock, are heat-extracted from the crude oil. The refiner periodically analyzes the chemical characteristics of the fractions.

Analysis of the exemplary liquids mentioned above may be carried out in at least two ways, each of which involves "tapping" the pipe or other liquid carrier to draw off a liquid sample.

One way to analyze such a liquid is to flow a small quantity of it to an instrument-type analyzer. Such analyzers are sensitive and easily damaged if the liquid flowing through the analyzer is excessively hot. Another way to analyze such a liquid is to take a "grab sample" in a container and carry it to a laboratory for analysis. Of course, the liquid should not be so hot that the container cannot be easily handled.

And while the difficulties involved in handling hot liquids are well known, not every type of industrial process-based installation is configured to permit analyzing liquid at a suitably-low temperature. Even if appropriate cooling equipment is between the process liquid carrier and the point at which the liquid is drawn off for sampling, the equipment may not always function properly.

And liquid temperature may change dramatically. A liquid which, at one stage in the process, is safe for an analyzer and readily handled in a container may be too hot at another stage of the process.

While temperature-sensitive valves are generally known, certain of them are unsuitable for use in industrial processes like those described above. For example, U.S. Pat. No. 4,438,777 (Pirkle) discloses a freeze protection valve which is normally closed and opens the main line to a drain port at below-freezing temperature.

An improved temperature-sensitive shutoff valve for industrial process systems which provides rapid shutoff in the presence of liquid at an undesirably-high temperature, which is readily panel mounted on process control panels, which, in specific embodiments, visually or electrically "annunciates" valve closure and which may be computer-monitored would be an important advance in the art.

OBJECTS OF THE INVENTION

It is an object of the invention to provide an improved temperature-sensitive shutoff valve suitable for use with industrial process systems.

Another object of the invention is to provide such a shutoff valve which provides rapid valve closure upon exposure to liquids at elevated temperature.

Another object of the invention is to provide such a shutoff valve which is panel mounted.

Another object of the invention is to provide such a shutoff valve which, in one embodiment, visually annunciates valve closure.

Yet another object of the invention is to provide such a shutoff valve which, in another embodiment, electrically annunciates valve closure.

Another object of the invention is to provide such a shutoff valve which may be computer-monitored. How these and other objects are accomplished will become apparent from the following descriptions and from the drawings.

SUMMARY OF THE INVENTION

The new temperature-sensitive valve is particularly useful in industrial processes, e.g., power generation, crude oil cracking and refinement, which involve liquids at sometimes-elevated temperature and where the liquids must occasionally be "tapped" from the process for analysis. The valve includes an elongate housing extending along a long axis and having a stationary valve seat in such housing. A valving member, a part of the valve body, is also in the housing and is mounted for movement in a first direction (i.e., toward the seat) from a flow-permitting first position spaced from the seat to a flow-blocking second position against the seat.

A latching mechanism is coupled to the valving member and retains such member in the first position when the temperature of the liquid flowing through the valve is below a shutoff temperature. An actuator is coupled to the latching mechanism and moves in a second direction (i.e., away from the seat) when the temperature of the fluid is above the shutoff temperature. At such elevated temperature, the actuator releases the latching mechanism, permitting the spring-urged valving member to close against the seat.

The new valve includes an inlet port and an outlet port formed in the housing and such ports are spaced from one another. In a particular embodiment of the valve (and when considered along the long axis of the valve), both the valve seat and the valving member are between the ports.

In another aspect of the invention, a portion of the valve body is "hollowed out" to form a chamber. The actuator is in (and part of) a wax-filled temperature-sensitive device (which is known per se) which has a head or sensing portion in the chamber. There is a fluid flow path through the chamber and fluid flowing along the path is in intimate, heat transfer relationship to the sensing portion and, most preferably, contacts the sensing portion for rapid valve response in the presence of a fluid at elevated temperature. (It is understood that the temperature-sensitive device is filled with wax which expands at a rather sharply-defined elevated temperature and urges the device actuator away from the sensing portion.)

In yet another aspect of the invention, the body includes a protruding rib-like land extending away from the axis. Where the valve body and housing interior have generally cylindrical cross-sections (the usual case), the land is an annular land. There are two flow apertures, both in fluid communication with the chamber. One aperture is on either side of the land and the land functions as a structure to direct flow through the apertures.

When the valve body and its valving member are in the first position with the valving member away from the valve seat, there is a liquid flow path through the body and the chamber. Such flow path is in flow communication with the inlet port, the opening through the valve seat, the two flow apertures, the chamber in the body and the outlet port.

Specific embodiments of the new valve have convenience features, as well. There is a reset button which is recessed in the housing when the valving member is away from the seat. When the latch mechanism is released and the valve "trips" so that valving member closes against the seat, the button protrudes from the housing. Another convenience feature is a position indicating switch having an electrical contact which changes state (i.e., from open to closed or from closed to open) when the valving member moves from the first position to the second position.

The new valve is configured to permit panel mounting and is for use on process systems operating at pressures up to about 5000 p.s.i. When the liquid flowing through the valve reaches set point temperature, e.g., 120° F., 140° F. or 160° F., the time required to release the latch mechanism and close the valve is on the order of 5 seconds or less. Other details of the new valve are set forth in the following detailed description and in the drawings.

DETAILED DESCRIPTIONS OF PREFERRED EMBODIMENTS

Figure 1:
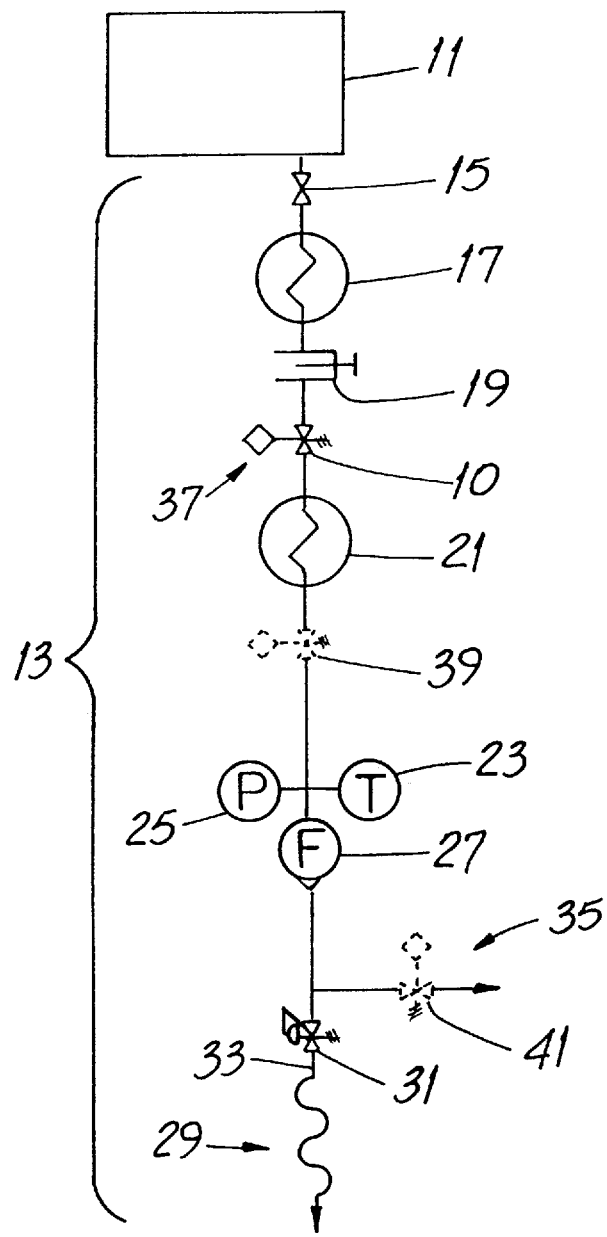
FIG. 1 is a representative diagram of an exemplary industrial process system including ancillary equipment associated with such system and used for, e.g., liquid sampling.

Before describing the new temperature-sensitive valve 10, it will be helpful to have an understanding of an exemplary installation in which the valve 10 is used. FIG. 1 shows a representation of an industrial plant 11 of the type which carries out a process involving a process liquid. A sampling system 13 is connected to the plant 11 and includes a system inlet isolation valve 15, a primary cooler 17, a pressure-reducing valve 19, a secondary cooler 21 and temperature, pressure and flow indicators 23, 25, 27, respectively. (An ideal pressure-reducing valve 19 is disclosed in U.S. Pat. No. 5,333,648 which is owned by the same assignee which owns the invention disclosed herein.)

A first branch 29 has a back-pressure regulating valve 31 and a pipe 33 for taking a grab sample in a container. A second branch 35 extends to one or more instrument-type analyzers. The preferred location for the valve 10 is at 37 while optional locations for the valve 10 are at locations 39, 41. (Certain operating precautions attend use of the valve 10 at either of the locations 39, 41.)

Figure 2:
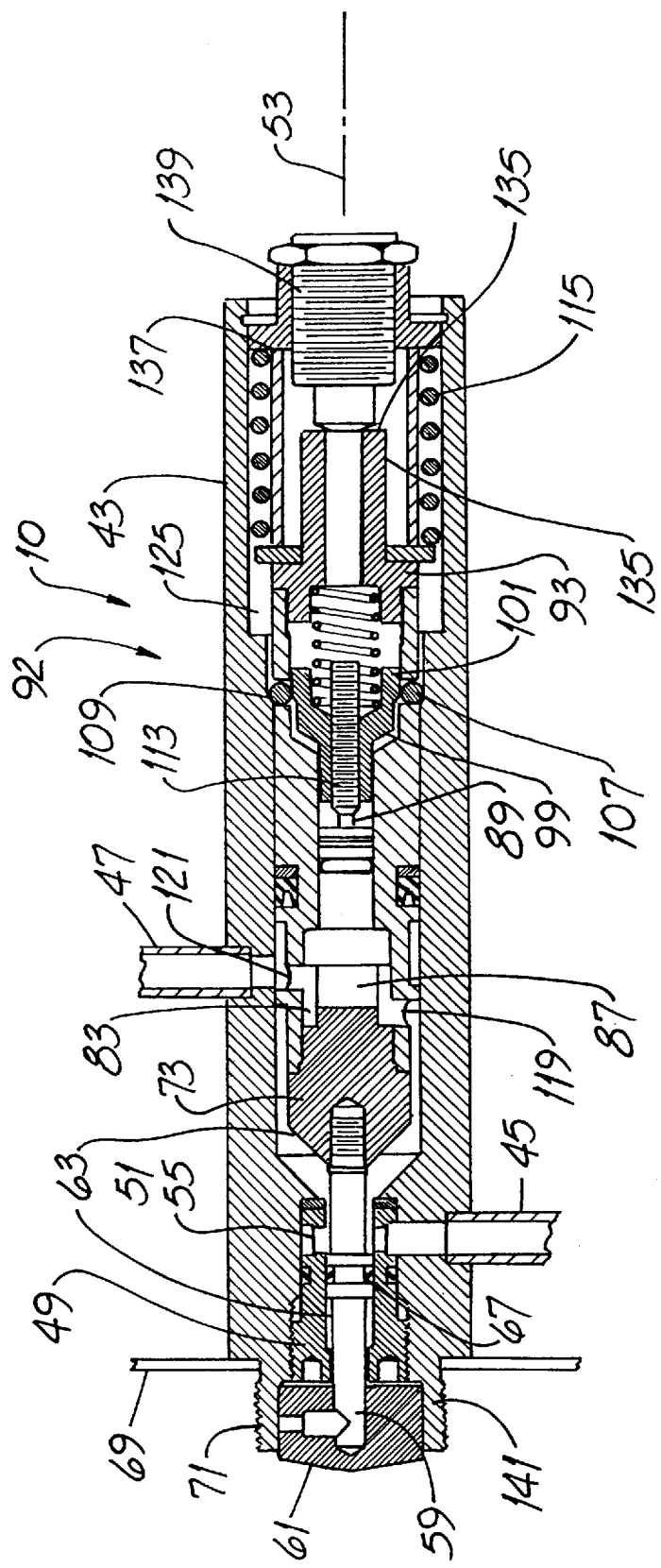
FIG. 2 is a cross-sectional elevation view of the new valve with its valving components in the open or "flow-permitting" position. Parts are broken away.
Figure 3:
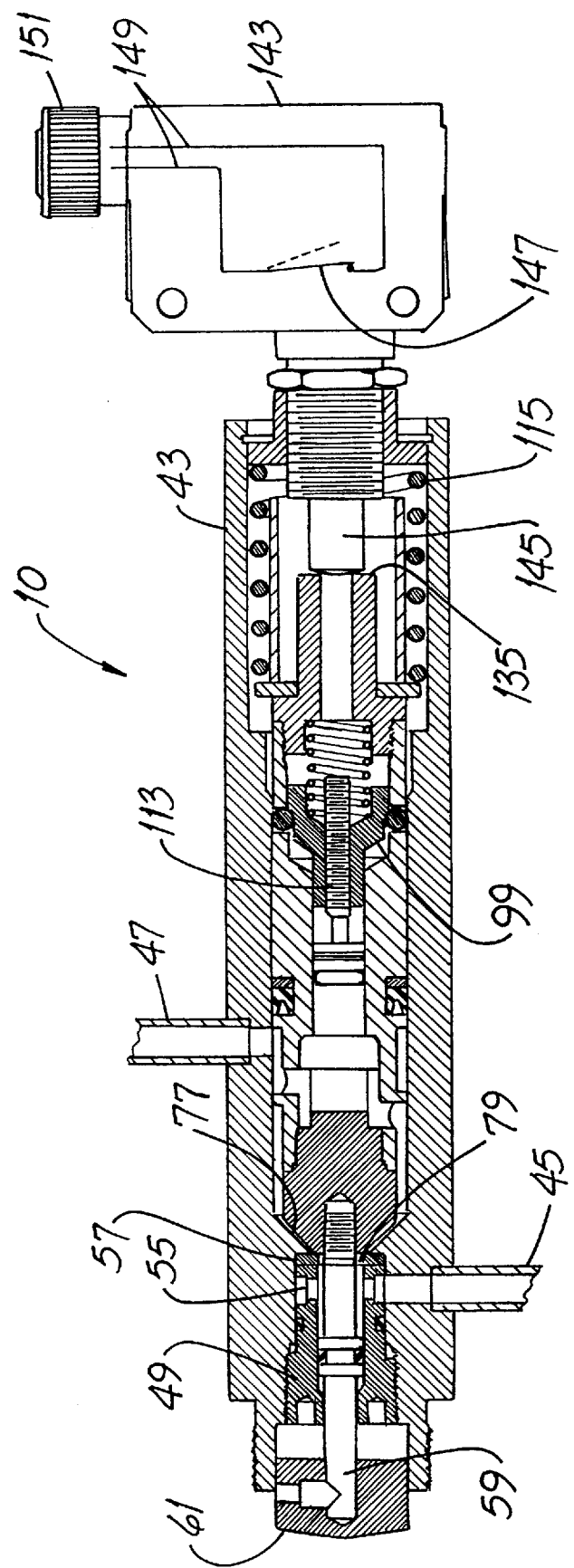
FIG. 3 is a cross-sectional elevation view like that of FIG. 2 and showing the valve with its valving components in the closed or "flow-blocking" position. Parts are broken away.
Figure 4:
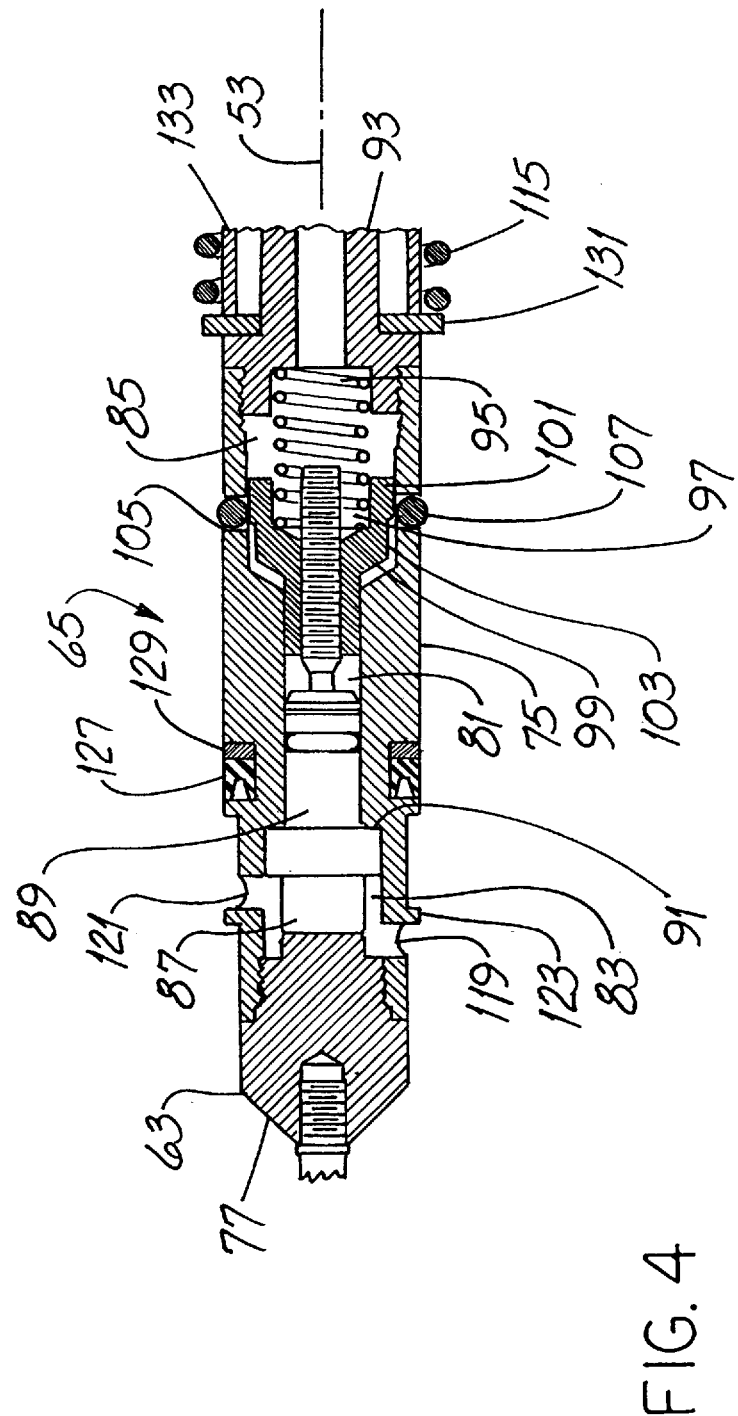
FIG. 4 is a cross-sectional elevation view of internal components of the valve of FIGS. 1 and 2. Parts are broken away.

Referring next to FIGS. 2, 3 and 4, the valve 10 includes an elongate, tube-like housing 43 which has an inlet port 45 and an outlet port 47. An insert 49 is threaded into a stepped bore and such insert 49 has a central passage 51 that extends along the valve long axis 53. There is a cross-hole 55 intersecting the passage 51 and a valve seat 57 is held in its fixed position by the insert 49.

A stem 59 extends through the central passage 51 and has respective ends attached to a reset button 61 and to the valving member 63 of the valve body 65. A sealing ring 67 prevents liquid leakage from the valve interior region as the stem moves with respect to the insert. The valve 10 is configured to permit mounting through an instrument panel 69 and is retained there by a lock nut (not shown) which engages the threads 71.

The valving member 63, part of a cap-like device 73 threaded to the body piece 75, has an annular valving surface 77 which is angled with respect to the axis 53. When the device 73 and its valving member 63 are in the flow-blocking second position shown in FIG. 3, the surface 77 is against the seat 57 and flow through the opening 79 in the seat 57 is prevented. In a specific embodiment, the device has two opposed wrench flats, not shown, which are used during assembly to tighten the device 73 with respect to the body piece 75.

The body piece 75 also includes an elongate bore 81, an enlarged chamber 83 at one end of the bore and an enlarged cavity 85 at the other end of such bore 81. The sensing portion 87 of a temperature-sensing device 89 is in the chamber 83 and the axial length of the body piece 75 and the location of the shoulder 91 are cooperatively selected so that when the temperature-sensing device 89 is mounted as shown, such device 89 is clamped and restrained between the cap-like device 73 and the shoulder 91, thereby fixing the position of the temperature-sensing device 89 in the body 65.

Details of the latching mechanism 92 will now be set forth. An end plug 93 is threaded to the body piece 75 and secures one end of a spring 95, the other end of which is in a pocket 97 in a latching cam 99. The cam 99 has an annular protruding shoulder 101 and a relieved annulus 103, the diameter of which is smaller than the diameter of the shoulder 101. The body piece 75 has a plurality of openings 105 through it, each for receiving a separate steel sphere 107 with slight clearance.

When the cam 99, the cam shoulder 101 and the spheres 107 are in their respective positions shown in FIG. 2, the spheres 107 extend radially outwardly beyond the outer surface of the body piece 75 and engage an annular latching face 109 formed in the housing 43 at an angle to the long axis 53. The coaction of the cam shoulder 101, spheres 107 and latching face 109 hold the body 65 in the position in the housing 43 that is shown in FIG. 2.

The device actuator 89 is coupled to the latching mechanism 92 by bearing against the adjustment stem threaded 113 into the latching cam 99. When the temperature of the sensing portion 87 is at or above the set point of the sensing device 89, e.g., 140° F., the device actuator 89 moves to the right and urges the cam 99 and its cam shoulder 91 rightwardly with respect to the body piece 75 and against the urging of the spring 95. Such movement permits the spheres 107 to be "cammed" (by the cooperative action of the compression-type body biasing spring 115 and the latching face 109) into their respective openings 105 and into the clearance annulus 103 between the latching cam 99 and the body piece 75. When the spheres 107 are thus withdrawn into the body 65, they no longer restrain the body 65 at the position in the housing 43 shown in FIG. 2 and such body 65 and its valving member 63 are moved in a first direction (in the views of FIGS. 2 and 3, leftwardly with respect to the housing 43) by the spring 115 until the valving surface 77 is against the seat 57 as shown in FIG. 3.

The unique porting and flow path arrangement of the new valve 10 will now be described. Referring to FIGS. 2 and 4, the inlet and outlet ports 45, 47, respectively, are spaced axially from one another. When considered along the long axis 53 of the valve 10, both the valve seat 57 and the valving member 63 are between the ports 45, 47.

The body has two flow apertures 119, 121 formed in it and such apertures 119, 121 constitute a chamber inlet aperture and a chamber outlet aperture, respectively. When the valve body 65 and its valving member 63 are in the first position with the valving member 63 away from the valve seat 57 as shown in FIG. 2, the aperture 119, the chamber 83 and the aperture 121 are in a fluid flow path through the chamber 83 and a process liquid flowing along the path is in intimate, heat transfer relationship to the sensing portion 87. In the specific embodiment of FIG. 2, liquid flowing along the path contacts the sensing portion 87 for rapid valve response.

The body 65 includes a protruding rib-like land 123 extending away from the axis 53. Where the valve body 65 and the interior of the housing 43 have generally cylindrical cross-sections (the usual case), the land 123 is an annular land and is in sliding engagement with the wall of the housing 43. Considered axially, one of the apertures 119, 121 is on either side of the land 123 which functions to direct flow through the apertures 119, 121. Liquid is prevented from migrating to the cylindrical spring pocket 125 by a U-cup seal 127 and backup ring 129. (It is to be appreciated that while the valve 10 has a high pressure rating, the liquid flowing through it is or should be at relatively low pressure.)

The valve 10 also has a spring bearing disc 131 and a cylindrical guide 133 in overlapping relationship with the nose 135 of the plug 93. When the valve 10 is open as shown in FIG. 2, the edge 137 of the guide 133 is against the gland 139 and serves as a positive stop limiting rightward travel of the valve body 65 in the housing 43.

Referring to FIGS. 2 and 3, specific embodiments of the new valve 10 have convenience features, as well. There is a reset button 61 attached to the stem 59 and recessed in a shroud 141 when the valving member 63 is away from the seat 57 as shown in FIG. 2. When the latch mechanism 92 is released and the valve 10 "trips" so that the valving member 63 closes against the seat 57 as shown in FIG. 3, the stem 59 and button 61 move leftwardly and the button 61 protrudes from the shroud 141. The button 61 thereby provides a visual indication that the valve 10 is closed. And when the device 89 cools to a temperature below the set point, depressing the button 61 re-latches the mechanism 92.

Another convenience feature is a position indicating switch 143 having a sliding plunger 145 spring-biased leftwardly and abutting the nose 135 of the plug 93 threaded into the body piece 75. The switch 143 has an electrical contact 147 which changes state (i.e., from open to closed or from closed to open) when the valving member 63 moves from the first position shown in FIG. 2 to the second position shown in FIG. 3. In a specific embodiment, the contact 147 is open (as shown in dashed line) when the valve 10 is in the open position and closes when the plunger 145 moves leftwardly as the valve 10 closes. The contact wires 149 are brought out through a wiring nut 151 and permit one or a group of valves 10 to be connected to an annunciator, a control system or a computer, for example.

While the principles of the invention have been shown and described in connection with a few preferred embodiments, it is to be understood clearly that such embodiments are by way of example and are not limiting.

What is claimed:

1. A temperature-actuated shutoff valve for handling fluids and including:
    a housing extending along an axis and having a single inlet port and a single outlet port axially spaced from the inlet port;
    a valve seat is fixed in the housing axially intermediate the ports;
    a valve body axially slidable in the housing and mounted for movement in a first direction from a flow-permitting first position spaced from the seat to a flow-blocking second position against the seat, the valve body including a fluid flow path in flow communication with the ports when the valve body is in the first position;
    a valving member mounted for coincident movement with the valve body;
    a latching mechanism coupled to the valving member for retaining such member in the first position when the temperature of the liquid is below a shutoff temperature; and
    an actuator coupled to the latching mechanism and moving in a second direction to position the valving member against the seat when the temperature of the fluid is above the shutoff temperature.

2. The valve of claim 1 wherein:
    the ports are radial with respect to the axis.

3. The valve of claim 2 wherein the valving member is between the ports.

4. The valve of claim 3 including a reset button protruding from the housing when the valving member is in the second position.

5. The valve of claim 3 including a position indicating switch coupled to the housing and actuated by a plunger mounted for movement along the axis.

6. The valve of claim 1 wherein:
    the actuator is in a temperature-sensitive device fixed in the valve body and having a sensing portion in the fluid flow path.

7. The valve of claim 6 wherein:
    fluid flowing along the path contacts the sensing portion.

8. The valve of claim 7 wherein fluid flowing along the path contacts the sensing portion.

9. The valve of claim 1 wherein:
    the valve body includes a land extending away from the axis; and
    the land is between the ports.

10. The valve of claim 9 wherein:
    the valve body contains an interior chamber coincident with the axis; and
    the ports are in fluid flow communication with the chamber.

11. The valve of claim 10 including a reset button protruding from the housing when the valving member is in the second position and urged into the housing when the button is depressed to reset the latching mechanism.

12. The valve of claim 10 including a position indicating switch having an electrical contact which changes state when the valving member moves from the first position away from the seat to the second position against the seat.

13. A temperature-actuated shutoff valve for handling liquids and including:
    a housing extending along a long axis and having an inlet port, an outlet port axially spaced with respect to the inlet port and a valve seat fixed in the housing coincident with the axis;
    a valve body in the housing and having a valving member, the body being mounted for movement in a first direction from a flow-permitting first position wherein the valving member is spaced from the seat to a flow-blocking second position wherein the valving member is against the seat;
    a chamber in the body;
    a temperature-sensitive device mounted in the body and having a sensing portion in the chamber;

a latching mechanism coupled to the body and retaining the valving member away from the seat when the temperature of the liquid is below a shutoff temperature, the latching mechanism releasing the valving member to the second position against the seat when the temperature of the liquid is above the shutoff temperature; and a single liquid flow path through the body and the chamber, the flow path being in flow communication with the inlet port and the outlet port when the valving member is away from the seat, the flow path being closed when the valving member is against the seat.

14. The valve of claim 13 wherein:

the body extends along the axis;

the body includes a land extending away from the axis; and the body includes two flow apertures formed in the body, one on either side of the land.

15. A temperature-actuated shutoff valve for handling fluids and including:

a housing having a valve seat in the housing;

a valve body with a valve member mounted thereto, the valve body being mounted for movement in the housing in a first direction from a flow-permitting first position spaced from the seat to a flow-blocking second position against the seat;

a chamber contained in the valve body;

a latching mechanism coupled to the valving member for retaining such member in the first position when the temperature of the liquid is below a shutoff temperature; and an actuator coupled to the latching mechanism and moving in a second direction when the temperature of the fluid is above the shutoff temperature, the actuator being embodied as a temperature-sensitive device having a sensing portion in the chamber;

the body has a fluid flow path through the chamber; and fluid flowing along the path contacts the sensing portion.

* * * * *